United States Patent [19]

Parl et al.

[11] Patent Number: 4,670,885

[45] Date of Patent: Jun. 2, 1987

[54] SPREAD SPECTRUM ADAPTIVE ANTENNA INTERFERENCE CANCELLER

[75] Inventors: Steen A. Parl, Arlington; John N. Pierce, Lexington, both of Mass.

[73] Assignee: Signatron, Inc., Lexington, Mass.

[21] Appl. No.: 705,613

[22] Filed: Feb. 26, 1985

[51] Int. Cl.[4] .............................................. H04B 7/08

[52] U.S. Cl. ....................................... 375/1; 455/276; 455/278; 455/284; 455/138; 342/380; 342/381; 375/102

[58] Field of Search ............... 455/273, 276, 278, 279, 455/283, 284, 137, 138, 206; 343/368, 371, 372, 379, 380, 381, 850, 852, 853; 333/117, 121; 375/1, 99, 102

[56] References Cited

U.S. PATENT DOCUMENTS

| | | | |
|---|---|---|---|
| 3,582,790 | 6/1971 | Curtis | 455/276 |
| 3,737,783 | 6/1973 | Oswald | 455/273 |
| 4,075,566 | 2/1978 | D'Arcangelis | 455/284 |
| 4,268,829 | 5/1981 | Baurle et al. | 343/380 |
| 4,309,769 | 1/1982 | Taylor, Jr. | 343/372 |

*Primary Examiner*—Benedict V. Safourek
*Attorney, Agent, or Firm*—Robert F. O'Connell

[57] ABSTRACT

An adaptive power equalizer circuit for use in a spread spectrum receiver system which includes an antenna system 12, 13 and a receiver 11, the circuit comprising adaptive power inversion circuitry 15 for producing a first signal having a minimized power level and a second signal having a substantially higher power level than that of the first signal. Such signals are supplied to a power equalizer circuitry 16 which equalizes the power levels thereof, such equalized power level signals then being combined in a suitable combiner circuit 30 for producing an output receiver output signal for the receiver 11.

16 Claims, 8 Drawing Figures

SPREAD SPECTRUM ADAPTIVE ANTENNA INTERFERENCE CANCELLER

INTRODUCTION

This invention relates generally to circuitry for processing spread spectrum signals and, more particularly, to circuitry for processing such signals so as to minimize interference signals received at a receiver for a spread spectrum communication system.

BACKGROUND OF THE INVENTION

In conventional spread spectrum communications systems, a difficulty exists in discriminating between the desired received communication signal and one or more interference signals which may also be received simultaneously therewith. Nulling techniques utilizing conventional adaptive nulling circuitry have been employed for minimizing the interference effects. Such current techiques utilize a transmitted reference or data decision signal which accompanies the originally transmitted communication signal in order to identify the communication signal at the receiver end. Alternative some current systems utilize an a priori knowledge of other characteristics of the desired waveform, such as the frequency hopping pattern thereof or the direction of arrival of the desired communication signal. Neither of such current approaches is a practical one for retrofitting of already existing antenna/receiver systems in order to provide the desired nulling capability for use with spread spectrum communications systems because existing systems may not have a transmitted reference signal available and the receiver in general is usually not equipped with a decision-directed mode of operation.

One further suggestion which has been used, for example, in spread spectrum communations systems which may be subject to some jamming or interference signals is to utilize two fixed antenna pairs, one with nulls in the forward and backward directions and one with nulls in directions orthogonal thereto. Each of the antenna systems comprises a pair of properly phased quarter wavelength spaced stubs, one pair of antennas, for example, at one location and the other at a separate location. The outputs of each antenna system would be connected to separate receivers with the best input being selected using suitable diversity techniques. Such an approach, however, seems to have limited capability, particularly where most of the potential jamming or interference signal angles of arrival are not adequately protected.

It is desirable, therefore, to develop a technique for providing some form of adaptive suppression of interference signals without the need for utilizing a transmitted reference signal or the need for other interfaces which require receiver or modem terminal modifications.

BRIEF SUMMARY OF THE INVENTION

In accordance with the invention an adaptive power equalization circuit is provided which interfaces directly between the radio frequency (RF) antenna system and the RF or intermediate frequency (IF) port of existing spread spectrum receiver circuits.

In accordance with the invention the adaptive power equalization circuitry is designed to sacrifice the small increment of performance associated with signal-to-interference ratios in the spread bandwidth at levels above 0 dB (i.e., where the interference signal is weaker or substantially equal to the desired communication signal), at which levels the spread spectrum gain is sufficient to permit reception of the desired transmitted signal. In the critical region where interference power is well above the signal, however, such adaptive power equalization circuitry provides interference protection over the specified dynamic range of operation of the system in addition to the spectrum spreading of the communication signal and it is in such critical region that the circuitry of the invention provides its desired improvement effects.

Thus circuitry in accordance with the invention maintains a signal-to-interference ratio that typically is only 2-3 dB (and at most below 5 dB) less than that of a theoretically optimum reference directed adaptive array. Accordingly, while an optimum reference directed adaptive array may yield signal-to-interference ratios better than −15 dB, the circuitry in accordance with the invention typically yields better than −18 dB to −17 dB ratios.

In accordance with the circuity of the invention a pair of antennas, normally operated side by side, for example, each receive incoming signals which may include both the desired spread spectrum communication signal and one or more undesired interference signals. The received signals are supplied to an adaptive power inversion circuit which produces a first, or difference, signal having a relatively low, i.e., minimized, power level and comprising primarily the weaker of the spread spectrum signals and the incoming interference signals (in effect, the larger signals are cancelled) and a second, or sum signal, which has a relatively higher power level than that of the difference signal and comprises both the spread spectrum signal and all of the incoming interference signals.

The difference and sum signals which are so obtained through the use of the adaptive power inversion circuit are then supplied to a power equalization circuit which provides difference and sum signals which have substantially equal power levels over the intended specified dynamic range of operation of the system. The equalized power level signals are then combined so as to provide a spread spectrum receiver output signal which has a substantially improved signal-to-interference ratio when this ratio at the input antennas is less than 0 dB, which signal can then be supplied to a conventional spread spectrum receiver circuit.

DESCRIPTION OF THE INVENTION

The invention can be described in more detail with the help of the accompanying drawings wherein FIG. 1A shows in broad block diagram form a conventional spread spectrum antenna/receiver system utilizing an antenna and a spread spectrum receiver circuit;

Figure 1A:
FIG. 1B shows in broad block diagram form such an antenna/receiver system utilizing the adaptive power equalization circuitry of the invention.
Figure 7:
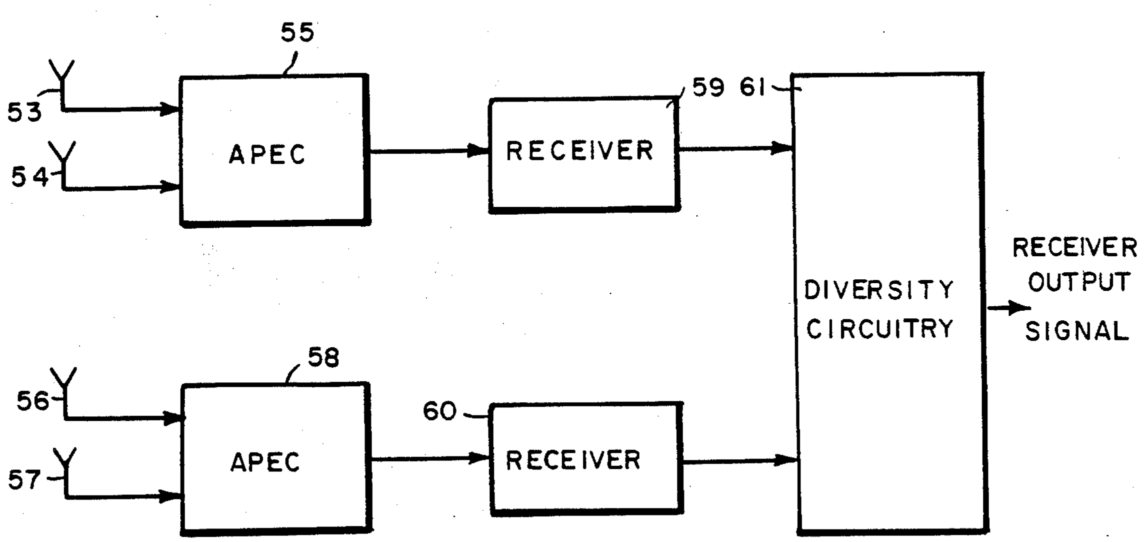

FIG. 7 shows an alternative block diagram arrangement for utilizing the invention in a different spread spectrum receiver context. As can be seen in FIG. 1A, a conventional spread spectrum receiver comprises an antenna system which utilizes, for example, a single antenna 10 the output of which is supplied to a receiver circuit 11 for processing so as to produce a received spread spectrum output signal therefrom.

Figure 1B:
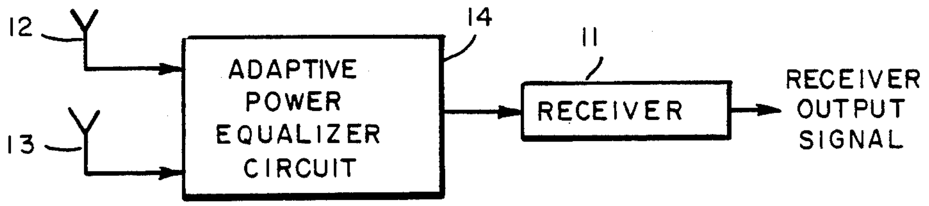

In utilizing the system of the invention in such a receiver system, as shown in FIG. 1B, an adaptive power equalization circuit 14 is utilized as an interface between two receiver antennas 12 and 13 and receiver circuit 11 for processing the signals in such a way as to improve the signal-to-interference ratio of the signal supplied to the receiver.

Figure 2:
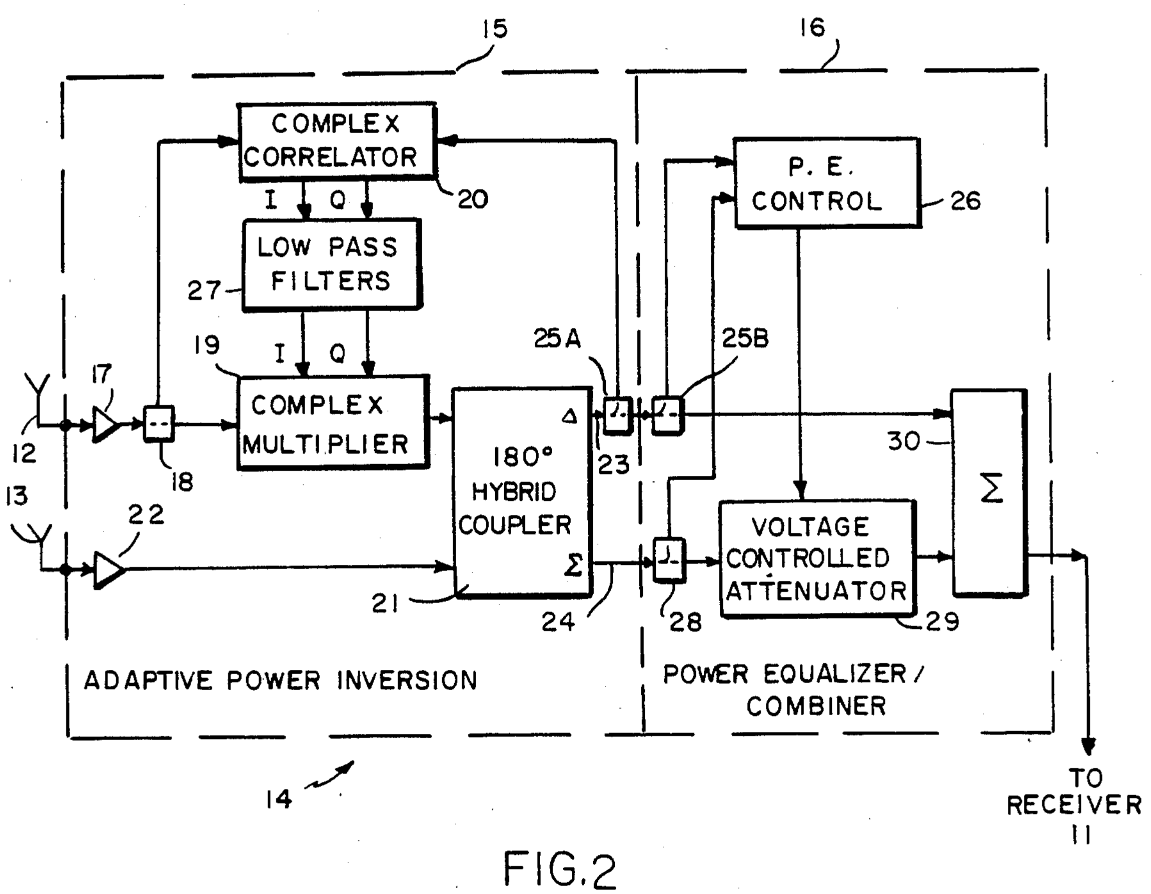
FIG. 2 shows a more detailed block diagram of one embodiment of an adaptive power equalization circuit for use in FIG. 1B.

A specific embodiment of the adaptive power equalization circuit of FIG. 1B is shown in FIG. 2, wherein the adaptive power equalization circuit 15 of the invention comprises a cascade of two circuits, one an adaptive power inversion circuit 15 and the other a power equalizer/combiner circuit 16. The function of the adaptive power inversion circuit 15 is to provide a signal at a first output port thereof, identified here as difference ( ) port 23, which has a minimized power level obtained by effectively cancelling the strongest input signal component. A signal is also provided at a second output port thereof, identified here as sum ( ) port 24, which has a much larger power level since it effectively represents the sum of all the input signal components. The function of the power equalizer/combiner circuit 16 is to equalize the power levels of such signals from the power inversion circuit over a specified dynamic range of operation of the system and to combine such equalizer power level signals for supply to the receiver circuit 11.

In accordance therewith, the input from antenna 12, for example, is supplied through a preamplifier 17 to a signal splitter circuit 18 one output of which is supplied to the input of a complex multiplier 19 and the other output of of which is supplied to a complex correlator 20. The output of complex multiplier 19 is supplied to one input of a 180° hybrid coupler circuit 21 the other input of which is supplied from antenna 13 via preamplifier 22.

Hybrid couple 21 produces two outputs, one identified as the output at output port 23 which output represents a difference in which the largest signal component, or components, of the input signals are cancelled, and the other identified as the output at output port 24 which output represents the sum of the input signal components. The difference signal is supplied to a signal splitter 25A which supplies the difference signal as a feedback signal to the other input of complex correlator 20 and as a minimized power level output from adaptive power inversion circuit 15. Correlator 20 provides in-phase and quadrature outputs which are supplied through low pass filters 27 to complex multiplier 19 as appropriate weighting signals. The in-phase and quadrature inputs of complex multipler 19 are utilized to adjust the amplitude and phase of the input signal from antenna 12 so as to suppress the strongest signal at the difference ( ) port 23 of hybrid coupler 21. The signal supplied at port 24, as mentioned above, includes the sum of all the input signal components.

Accordingly, in the presence of a relatively large interference signal the difference output at port 23 will contain the desired spread spectrum communication signal together with a relatively weak inteference signal, which has been effectively cancelled, while the sum output at port 24 will contain the relatively strong interference signal together with the spread spectrum communication signal. Hence, the overall power level of the difference signal at port 23 will be substantially lower (effectively minimized) than that of the sum signal at port 24.

In the particular power equalization/combiner circuit 16 of FIG. 2, the difference signal is supplied from signal splitter 25A through another signal splitter 25B to one input of a power equalization control circuit 26 and to an input of combiner (summation) circuit 30. The sum signal at port 24 is supplied via signal splitter 28 to a voltage controlled attenuator circuit 29 and also to another input of power equalization control circuit 26. The output from attenuator 29 is supplied to the other input of combiner circuit 30. Control circuit 26 is arranged as would be known to those in the art to provide a control signal as a function of the power level difference between the $\Delta$ and $\epsilon$ signal inputs thereto which controls the voltage at the voltage controlled attenuator so as to control the attenuation of the sum signal from signal splitter 28 so that at the inputs to combiner circuit 30 the power level of the signal from signal splitter 25B and the power level of the signal from the output signal of attenuator circuit 29 are substantially equal over a specified dynamic range of operation of the system. Such equalized power level signals are then combined in circuit 30 to provide an output receiver signal for use by receiver circuit 11.

In utilizing the adaptive power inversion circuit 15 and the power equalization/combiner circuit 16 it is found that the summed signal supplied to receiver 11 will contain substantially equal proportions of the interference signals and the desired spread spectrum communication signal. The spread spectrum gain of the signal in receiver 11 will then be sufficient to permit demodulation thereof to provide the desired receiver output signal for use by the communication system of which the receiver circuit is a part.

In the presence of a strong interference signal the signal-to-interference ratio will be substantially improved over the system dynamic operating range utilizing the adaptive power equalization circuitry of the invention and the larger the interference signal the larger the improvement which will occur.

Further, the circuitry of the invention can be used in the presence of weak interference and even in the abscence of any interference at all. Thus, the overall signal-to-noise ratio can be reduced when a desired spread spectrum communication signal is present but little or no interference is present. Under such conditions the difference signal will primarily comprise "noise" or weak interference signals (the desired relatively stronger spread spectrum signal being effectively cancelled) and the sum signal will primarily comprise the stronger spread spectrum signal plus the weak interference and noise signal. Equalization of the power levels thereof will still permit the receiver to demodulate the desired signal for use by the system due to its sufficient spread spectrum gain characteristics. In the presence of noise alone (no real interference signal) the above operation will also occur and the signal-to-noise ratio will be reduced to 0 dB over the full band. Accordingly, since receiver spread spectrum gain allows operation well below a 0 dB signal-to-interference ratio, there is virtually no penalty due to the insertion of the adaptive power equalization circuitry in the receiver system even under conditions where substantially little or no interference is present.

Figure 3:
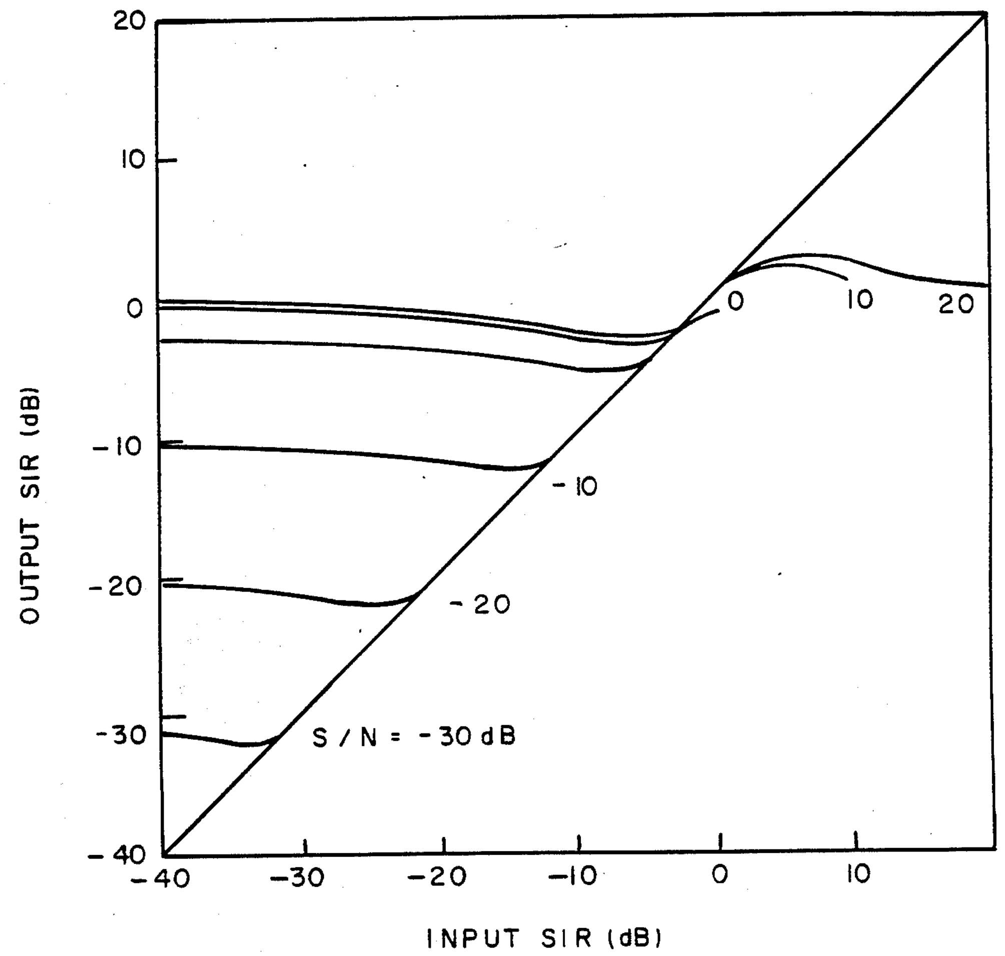
FIG. 3 shows a performance curve which depicts the output signal-to-interference ratio as a function of input signal-to-interference ratio for a typical system in accordance with the invention.

Further, no modifications of the receiver 11 are required in order to utilize the adaptive power equalization circuitry of the invention. The adaptive power equalization unit can be made relatively compact to fit either existing or for use in newly designed receiver systems at reasonable cost in terms of the improvement obtained. FIG. 3 shows a graph which depicts exemplary curves of output signal-to-interference ratios as a function of the input signal-to-interference ratios obtainable when using the adaptive power equalization techniques of the invention. As can be seen, greatly improved performance is achieved at low input signal-to-interference ratios where there are relatively strong interference signals while at the same time good performance at high input signal-to-interference ratios where there are relatively weak interference signals is still obtained due to the spread spectrum gain which is available in the receiver circuitry.

Figure 4:
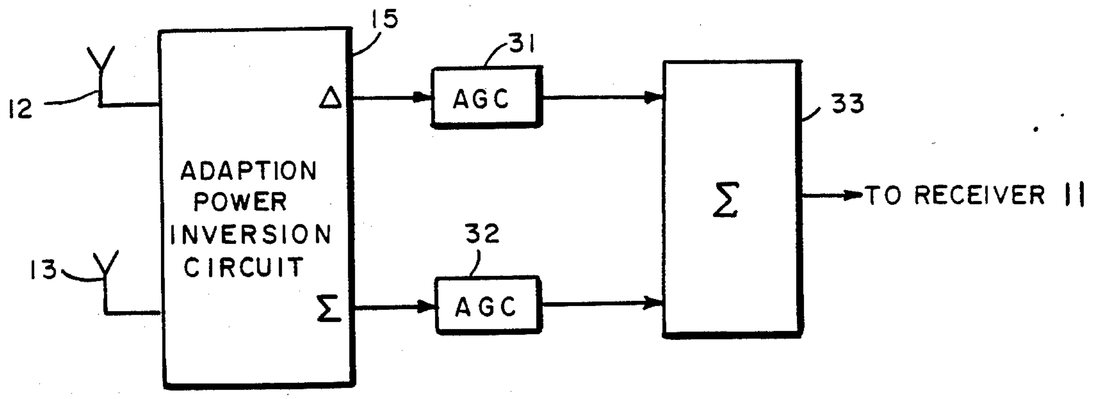
FIG. 4 shows a block diagram of an alternative embodiment of a power equalizer/combiner circuit of FIG. 2.

The power equalizer circuit of the embodiment shown in FIG. 2 is useful for providing effective operation over a specified dynamic range of operation. For example, it is generally effective where the range of input signal-to-interference ratios up to −30 dB, it may be found that in some applications where the desired signal power is much weaker in comparison with the interference signal power, attenuations much greater than that tend to provide signals of equalized power levels which are sufficiently low as to be in the order of magnitude of noise signals which may be present. To extend the operating range, an alternative embodiment of such power equalization operation can be achieved using an embodiment depicted in FIG. 4, for example. In such embodiment, both the Δ-output and the Σ-output from power inversion circuit 15 can be supplied to automatic gain control (AGC) circuits 31 and 32, respectively, each arranged to provide automatic gain operation, using well-known AGC circuitry techniques, set in each to provide the same desired power level outputs therefrom so that equalized power level signals from AGC circuits 31 and 32 are supplied to combiner circuit 33. The gain controls in each case can be arranged to provide equalized power levels over a wide dynamic range of operation, as desired.

Figure 5:
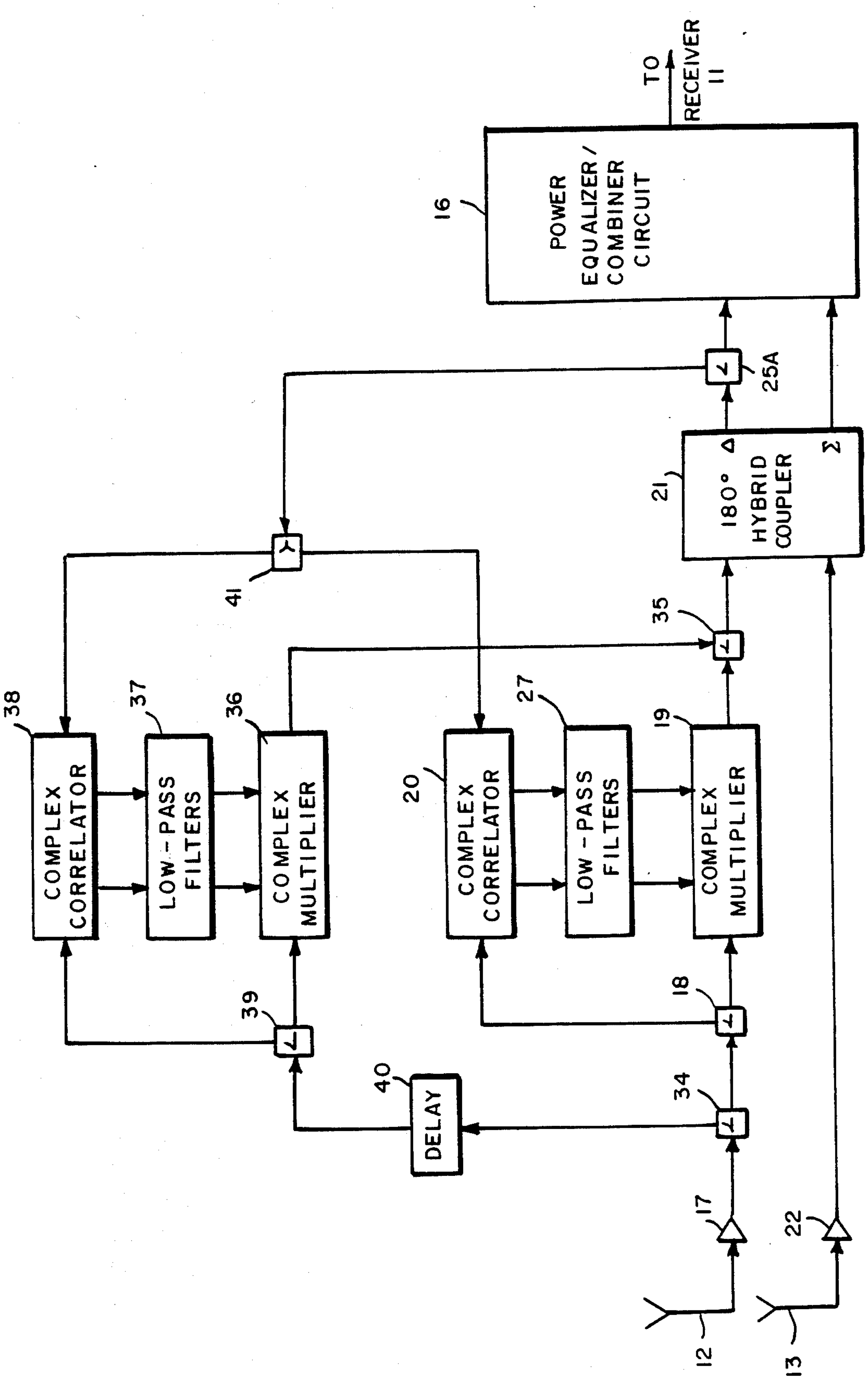
FIG. 5 shows a block diagram of an alternative embodiment of an adaptive power inversion circuit of FIG. 2.

A further alternative embodiment of the circuitry of FIG. 2 is shown in FIG. 5 with respect to the adaptive power inversion circuit thereof. The circuit of FIG. 5 makes use of delay circuitry and added complex weighting circuits. The input signals from antenna 12 and preamplifier 17 is supplied to a signal splitter 34 and thence to signal splitter 18 for use as in FIG. 2 for providing an adjustment of the amplitude and phase by the weights generated by the complex correlator 20, filters 27, and multiplexer 19, as before. The weighted output is supplied to signal combiner 35 where it is combined with the weighted output from a complex multipler 36 for providing an input signal to hybrid coupler 21. The complex multiplier 36 in conjunction with complex correlator 38 and low pass filters 37 produce a weighted output of the input signal delayed by a controlled time delay at delay circuit 40 which receives the input signal from signal splitter 34 and supplies a delayed input signal to signal splitter 39 for use by complex correlator 38 and complex multipler 36. In the case of each complex weighting operation, the feedback inputs to correlators 20 and 38 are supplied from the output of hybrid coupler 21 via signal splitters 25A and 41, as shown.

The non-delayed and delayed input signals can be achieved by utilizing, for example, a conventional tapped delay line for such purpose. The use of such delayed signal technique using more than one adaptive power inversion loop tends to improve the suppression of wideband noise-like interference over that achievable with a single adaptive loop of FIG. 2. The circuit of FIG. 5 can be further extended by using a greater number of adaptive loops operating with a number of different delays of the input signal. Such operation can be achieved by using a multiple tapped delay line for such purpose.

Figure 6:
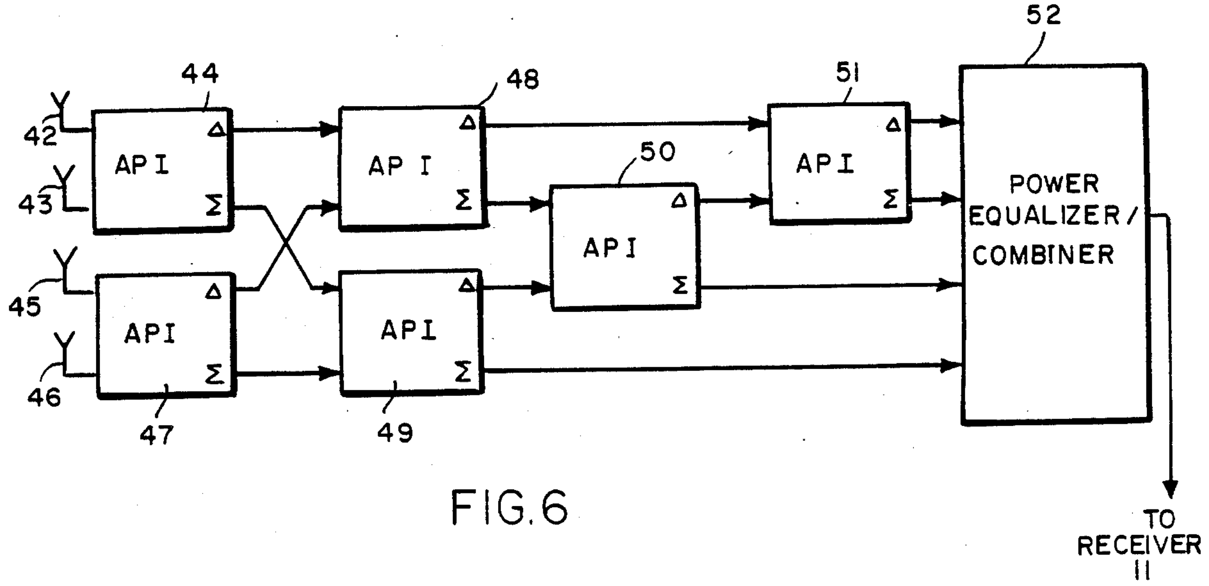
FIG. 6 shows an alternative arrangement of an adaptive power equalization circuitry for a spread spectrum receiver system which utilizes four antennas.

While the various embodiments of the system of the invention utilize two input antennas the circuitry can also be extended to the use of more than two antennas, thus allowing it to suppress more effectively multiple interference signals. Such a system is depicted in FIG. 6 for use with four antennas. In such a system the overall adaptive power equalization circuitry comprises multiple adaptive power inversion circuits and a single power equalizer/combiner circuit.

As shown therein a pair of input antennas 42 and 43 supply input received signals at the inputs of adaptive power inversion circuit 44 which is of the same type as those discussed above in FIGS. 2 and 5, for example. A second pair of antennas 45 and 46 supply input received signals to a similar adaptive power inversion circuit 47. The difference signal outputs from circuits 44 and 47 are supplied to the inputs of a further adaptive power inversion circuit 48, while the sum signal outputs from circuits 44 and 47 are supplied to the inputs of a still further adaptive power inversion circuit 49. The difference output from adaptive power inversion circuit 49 is supplied to one input of a further adaptive power inversion circuit 50, while the sum output of inversion circuit 48 is supplied to the other input thereof. The difference output from inversion circuit 48 is supplied to one input of adaptive power inversion circuit 51, the other input of which is obtained from the difference output port of inversion circuit 50 as shown.

The (Δ) output from inversion circuit 51 will have the three strongest signal components cancelled. The (Σ) output from inversion circuit 51 will have only the two strongest signal components cancelled. The (Σ) output from inversion circuit 50 will have only the strongest signal component cancelled. The (Σ) output from the inversion circuit 49 will contain all the signal components. For example, with only the desired signal present, only the (Σ) port from circuit 42 will contain that signal, the other will contain only noise.

Finally, the difference output of inversion circuit 51, the sum output therefrom, the sum output from inversion circuit 50 and the sum output from inversion circuit 49 are all supplied to an appropriate power equalizer/-combiner circuit 52 which is arranged to equalize the power levels in each of its four input signals, as by using appropriate AGC circuitry techniques, for example, as discussed above. These equalized power level signals are then combined to produce the output receiver signal for supply to receiver 11.

For the four antenna input system it is found that the signal-to-interference ratio of the output signal will tend to be closer to −5 dB rather than to the 0 dB obtained for a two antenna system. In general, it has been found that the system can be extended to an N-antenna system, utilizing the approach depicted, in the general case the output signal-to-interference ratio being expressed as $-10 \log_{10}(N-1)$. The four antenna system shown in FIG. 6 achieves such output signal-to-interference ratio with up to three different interference waveforms. In general an N-antenna system can handle up to N−1 interference waveforms, the general case requiring a specified number of adaptive power inversion circuits which can be expressed as $N(N-1)/2$.

Still another embodiment of a four antenna system which utilizes a pair of receivers and, in effect, provides for diversity type operation in which a selection of the best receiver output is obtained using conventional diversity selection techniques as depicted in FIG. 7. As can be seen therein, a first pair of antennas 53 and 54 are used to supply input signals to an adaptive power equalization circuit 55 in accordance with the invention while a second pair of antennas 56 and 57 are used to supply inputs to a second adaptive power equalization circuit 58 in accordance with the invention. The outputs of circuits 55 and 58 are supplied, respectively, to separate receivers 59 and 60 which provide signals which can be appropriately selected utilizing diversity receiver selection circuity 61. The latter circuitry is well knwon to those in the art for selecting a signal from one of two or more which has the greater signal-to-interference ratio for use as an output signal therefrom for supply to the rest of the communication system. The antenna pairs utilized therein can be placed, for example, at different locations for looking in different directions so as to take care of interference problems that are expected to be received from such different directions. Again, the system of FIG. 7 can be extended to N-antennas and N/2 diversity channels.

Adaptive power equalization circuitry in accordance with the invention can be designed for use either at RF frequencies or at IF frequencies and can be positioned so as to interface either the RF or IF portions of a receiver system. While the invention has been described above in various embodiments, other modifications thereof utilizing the inventive concept described may be devised by those in the art within the spirit and scope of the invention. Hence the invention is not to be limited to the particular embodiments described above, except as defined by the appended claims.

What is claimed is;

1. An adaptive power equilizer means for use in a spread spectrum signal receiver system which includes at least two antenna means, each of which receives at least two incoming signals from unknown directions, one of said incoming signals having a higher power level than the other, and receiver means, said adaptive power equalizer means comprising adaptive means responsive to said incoming antenna signals for producing a first signal in which the signal having the higher power level has been effectively cancelled and for producing a second signal;

power equalizer means responsive to said first and second signals for causing the power levels of said first and second signals to be substantially equal; and means for combining said substantially equalized power level signals for providing an output receiver signal for use by said receiver means.

2. An adaptive power equalizer means in accordance with claim 1 wherein said incoming signals include a spread spectrum signal and at least one interference signal having a power level higher than that of said spread spectrum signal, said adaptive means producing said first signal comprising primarily said spread spectrum signal, said interference signal being effectively cancelled therein, and producing said second signal comprising said interference signal and said spread spectrum signal; and said combining means providing an output signal comprising said spread spectrum signal and said interference signal, the power levels of each being substantially equal.

3. An adaptive power equalizer means in accordance with claim 1 wherein said antenna means comprises two antennas and said adaptive means is an adaptive power inversion circuit which comprises at least one weighting loop circuit for multiplying the incoming signal received at one of said antennas by a weighting factor to provide a weighted signal;

a hybrid coupler means responsive to said weighted signal and to the incoming signal received at the other of said antennas for providing said first signal at a difference port thereof and said second signal at a sum port thereof.

4. An adaptive power equalizer means in accordance with claim 3 wherein said weighting loop circuit includes complex multiplier means;

complex correlator means;

means respŏnsive to the incoming signal received at said one of said antennas for supplying said incoming signal to said complex multiplier means and to one input of said complex correlator means;

means responsive to said first signal for supplying said first signal to the other input of said complex correlator means;

said complex correlator means thereby producing a correlated output signal;

filter means responsive to said correlated output signal for providing a filtered weighting signal;

said complex multipler being responsive to said filtered weighting signal and to the incoming signal from said one of said antennas to provide said weighted signal.

5. An adaptive means circuit in accordance with claim 4 wherein said correlated output signal and said filtered weighting signal each has in-phase and quadrature components.

6. An adaptive power equalizer means in accordance with claim 1 wherein said power equalizer means comprises means responsive to said second signal for controllably attenuating the power level of said second signal;

control means responsive to said first signal and to said second signal for supplying a control signal to said attenuating means so as to controllably attenuate the power level of said second signal in a manner so as to be equal to the power level of said first signal;

said combining means being responsive to said first signal and to the controllably attenuated second signal for providing said output receiver signal.

7. An adaptive power equalizer means in accordance with claim 6 wherein said combining means is a summation circuit.

8. An adaptive power equalizer means in accordance with claim 1 wherein said power equalizer means comprises first automatic gain control circuitry responsive to said first signal for providing a first gain controlled signal having a selected power level;

second automatic gain control circuitry responsive to said second signal for providing a second gain controlled signal having substantially the same said selected power level;

said combining means being responsive to said first and second gain controlled signals for providing said output receiver signal.

9. An adaptive power equalizer means in accordance with claim 1 wherein said antenna means comprises two antennas and said adaptive means is an adaptive power inversion circuit which comprises a pair of weighted loop circuits, one of said weighted loop circuits being responsive to the incoming signal from one of said antennas and to said first signal for providing a first weighted signal and the other of said weighted loop circuits being responsive to the incoming signal time delayed by a selected time period and to said first signal for providing a second weighted signal;

means for combining said first and second weighted signals for providing an overall weighted signal;

hybrid complex means responsive to said overall weighted signal and to the incoming signal received at the other of said antennas for providing said first signal at a difference port thereof and said second signal at a sum port thereof.

10. An adaptive power equalizer means in accordance with claim 9 wherein each of said weighted loops includes complex correlator means responsive to said first signal and to other incoming signal supplied thereto for providing a correlated output signal;

filter means responsive to said correlated output signal for providing a filtered weighting signal; and multiplier means responsive to said filtered weighting signal and to the incoming signal supplied thereto for providing the weighted signal therefrom.

11. An adaptive power equalizer means in accordance with claim 1 wherein said antenna means comprises four antennas and said adaptive means includes a plurality of adaptive power inversion circuits comprising a first said circuit responsive to the incoming signals received at two of said antennas for producing first difference and sum signals therefrom;

a second said circuit responsive to the incoming signals received at the other two of said antennas for producing second difference and sum signals therefrom;

a third said circuit responsive to said first and second difference signals for producing third difference and sum signals;

a fourth said circuit responsive to said first and second sum signals for producing fourth difference and sum signals;

a fifth said circuit responsive to said third sum signal and to said fourth difference signals for producing fifth difference and sum signals;

a sixth said circuit response to said third difference signal and to said fifth difference signal for producing sixth difference and sum signals; and further wherein said power equalizer means is responsive to said sixth difference signal, said sixth sum signal, said fifth sum signal and said fourth sum signal for equalizing the power levels thereof; and said combining means combines said equalized power level signals to provide an output receiver signal for said receiver means.

12. An adaptive power equalizer means in accordance with claim 1 wherein said antenna means comprises N antennas and said adaptive means includes a plurality of N(N−1)/2 adaptive power inversion circuits said adaptive power inversion circuits being responsive to the incoming signals received at said N antennas for producing a difference output signal and (N−1) sum output signals; and further wherein said power equalizer means is responsive to said difference output signal and to said (N−1) sum output signals for equalizing the power levels thereof; and said combining means combines said equalized power level signals to provide said output receiver signal.

13. An adaptive power equalizer means in accordance with claim 1 wherein said antenna means comprises four antennas and said receiver means comprises two receivers, said adaptive power equalizer means including a pair of adaptive power equalizer means in accordance with claim 1, one of said adaptive power equalizer means being responsive to the incoming signals at one pair of said four antennas for providing an output receiver signal for one of said receivers and the other of said adaptive power equalizer means being responsive to the incoming signals received at the other pair of said four antenna means for providing an output receiver signal for the other of said receivers.

14. A spread spectrum communications receiving system for use in reducing the effects of at least one interference signal on the reception of a transmitted spread spectrum communications signal received by said receiver system, said system comprising antenna means for receiving said transmitted spread spectrum signal and said at least one interference signal from unknown directions, said at least one interference signal having a higher power level than said spread spectrum signal;

at least one adaptive power equalizer means in accordance with claim 1 responsive to the spread spectrum signal and the at least one interference signal received at said antenna means for providing a spread spectrum receiver output signal in which the effects of said at least one interference signal is reduced, the adaptive means of said at least one adaptive power equalizer means being responsive to the signal received at said antenna means for producing a first signal in which said at least one interference signal has been effectively cancelled and a second signal which includes said spread spectrum signal and said at least one interference signal, the power equalizer means of said adaptive power equalizer means being responsive to said first and second signals for causing the power levels of said first and second signals to be substantially equal; and the combining means of said adaptive power equalizer means combining said substantially equalized power level signals for producing a spread spectrum output receiver signal; and receiver means for receiving said spread spectrum output receiver signal.

15. An adaptive power equalizer means in accordance with claim 1 wherein said incoming signals include a spread spectrum signal and at least one interference signal, said spread spectrum signal having a power level higher than that of said at least one interference signal, said adaptive means producing said first signal comprising primarily said interference signal, said spread spectrum signal being effectively cancelled therein, and producing said second signal comprising said spread spectrum signal and said at least one interference signal; and said combining means providing an output signal comprising said spread spectrum signal and said at least one interference signal, the power levels of each being substantially equal.

16. A spread spectrum communications receiving system for use in reducing the effects of at least one interference signal on the reception of a transmitted spread spectrum communications signal received by said receiver system, said system comprising antenna means for receiving said transmitted spread spectrum signal and said at least one interference signal from unknown directions, said spread spectrum signal having a higher power level than said at least one interference signal;

at least one adaptive power equalizer means in accordance with claim 1 responsive to the spread spectrum signal and the at least one interference signal received at said antenna means for providing a spread spectrum receiver output signal in which the effects of said spread spectrum signal is reduced, the adaptive means of said at least one adaptive power equalizer means being responsive to the signals received at said antenna means for producing a first signal in which said spread spectrum signal has been effectively cancelled and a second signal which includes said spread spectrum signal and said at least one interference signal, the power equalizer means of said adaptive power equalizer means being responsive to said first and second signals for causing the power levels of said first and second signals to be substantially equal; and the combining means of said adaptive power equalizer means combining said substantially equalized power level signals for producing a spread spectrum output receiver signal; and receiver means for receiving said spread spectrum output receiver signal.

* * * * *